United States Patent
Tsugane

(10) Patent No.: US 11,226,798 B2
(45) Date of Patent: Jan. 18, 2022

(54) INFORMATION PROCESSING DEVICE AND INFORMATION PROCESSING METHOD

(71) Applicant: FUJITSU LIMITED, Kawasaki (JP)

(72) Inventor: Keisuke Tsugane, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 92 days.

(21) Appl. No.: 16/744,287

(22) Filed: Jan. 16, 2020

(65) Prior Publication Data
US 2020/0249923 A1   Aug. 6, 2020

(30) Foreign Application Priority Data

Feb. 4, 2019 (JP) .............................. JP2019-017824

(51) Int. Cl.
  *G06F 9/44* (2018.01)
  *G06F 8/41* (2018.01)
  *G06F 9/30* (2018.01)

(52) U.S. Cl.
  CPC .......... *G06F 8/433* (2013.01); *G06F 9/30065* (2013.01)

(58) Field of Classification Search
  CPC .............................. G06F 8/433; G06F 9/30065
  USPC .......................................... 717/150, 159–161
  See application file for complete search history.

(56) References Cited

U.S. PATENT DOCUMENTS

| | | | | |
|---|---|---|---|---|
| 6,070,011 A | * | 5/2000 | Liu ......................... | G06F 8/433 717/154 |
| 8,060,870 B2 | * | 11/2011 | Eichenberger .......... | G06F 8/447 717/160 |
| 8,793,675 B2 | * | 7/2014 | Lin .......................... | G06F 8/456 717/160 |
| 8,930,926 B2 | * | 1/2015 | Bastoul ................... | G06F 8/453 717/151 |

(Continued)

FOREIGN PATENT DOCUMENTS

| | | |
|---|---|---|
| JP | 2000-347879 | 12/2000 |
| JP | 2015-194881 | 11/2015 |

OTHER PUBLICATIONS

Cortesi et al., "Origin2000 and Onyx2—Performance Tuning and Optimization Guide", 1998, Silicon Graphics, Inc., pp. 1-325. (Year: 1998).*

(Continued)

*Primary Examiner* — Ted T. Vo
(74) *Attorney, Agent, or Firm* — Fujitsu Patent Center

(57) ABSTRACT

An information processing device includes: a processor coupled to a memory and configured to: obtain a source code including loop operations, statements being included in the loop operations; split each of the loop operations into a plurality of loop operations to maintain dependency relationships among statements in the source code; and in a case where the two statements each included in corresponding one of the two loop operations after the split have a plurality of data structures including elements including contiguous addresses, when the total number of the data structures (Continued)

included in the two statements does not exceed a number of memory fetch streams, perform a fusion of the two loop operations to maintain a dependency relationship between the two statements, and when the total number of the data structures included in the two statements exceeds the number of memory fetch streams, not perform the fusion.

10 Claims, 16 Drawing Sheets

(56) References Cited

U.S. PATENT DOCUMENTS

2007/0003161 A1* 1/2007 Liao ..................... G06F 8/456
382/276
2015/0277876 A1 10/2015 Yamanaka

OTHER PUBLICATIONS

Singhai et al., "A Parametrized Loop Fusion Algorithm for Improving Parallelism and Cache Locality", 1997, The Computer Journal, vol. 40, No. 7, 25 pages. (Year: 1997).*
Ramirez et al., "Fetching instruction streams", 2002, IEEE, pp. 371-382. (Year: 2002).*
Padua et al., "Advanced Compiler Optimizations for Supercomputers", 1986, ACM, vol. 29, No. 12, pp. 1184-1201. (Year: 1986).*

* cited by examiner

FIG. 3

NUMBER OF ARRAYS: 2 — SC2
```
for (int i = 0; i < ni; i++)
  A1[i] += A2[i];
```

NUMBER OF ARRAYS: 3 — SC3
```
for (int i = 0; i < ni; i++)
  A1[i] += A2[i] + A3[i];
```

NUMBER OF ARRAYS: 4 — SC4
```
for (int i = 0; i < ni; i++)
  A1[i] += A2[i] + A3[i] + A4[i];
```

NUMBER OF ARRAYS: 5 — SC5
```
for (int i = 0; i < ni; i++)
  A1[i] += A2[i] + A3[i] + A4[i] + A5[i];
```

FIG. 13

INPUT SOURCE CODE

```
for (i = 0; i < ni; i++) {
  A[i] = alpha; /* Stmt0 */
  B[i] = beta;  /* Stmt1 */
  for (j = 0; j < nj; j++) {
    C[i][j] += A[i]; /* Stmt2 */
    C[i][j] += B[i]; /* Stmt3 */
    D[i][j] += B[i]; /* Stmt4 */
  }
}
``` ically described will be described. FIG. 1 is a diagram for describing loop fission.

INFORMATION PROCESSING DEVICE AND INFORMATION PROCESSING METHOD

CROSS-REFERENCE TO RELATED APPLICATION

This application is based upon and claims the benefit of priority of the prior Japanese Patent Application No. 2019-017824, filed on Feb. 4, 2019, the entire contents of which are incorporated herein by reference.

FIELD

A certain aspect of embodiments described herein relates to an information processing device, a non-transitory computer-readable storage medium, and an information processing method.

BACKGROUND

One of methods for improving the execution speed of a program is loop fission. Loop fission is a method that splits a loop operation into two or more loop operations when a program includes the loop operation. This reduces the number of statements included in one loop operation. Thus, cache misses can be reduced when the loop operation is executed, which in turn improves the execution speed of the program.

When the quantity of codes of the program is large, it is difficult to manually perform loop fission. In this case, loop fission is often performed by a compiler.

However, the compiler performs loop fission without considering the hardware configuration of the processor that is to execute the program. Therefore, the compiler does not always output the program that is optimal for the processor to improve the execution speed of the program. Note that the techniques related to the present disclosure is also disclosed in Japanese Laid-open Patent Publications Nos. 2015-194881 and 2000-347879.

SUMMARY

According to an aspect of the embodiments, there is provided an information processing device including: a memory; and a processor coupled to the memory and configured to: obtain a source code including loop operations, where a plurality of statements being included in at least one of the loop operations; split each of the loop operations into a plurality of loop operations to maintain dependency relationships among statements in the source code; and in a case where the two statements each included in corresponding one of the two loop operations after the split have a plurality of data structures including elements including contiguous addresses, when the total number of the data structures included in the two statements does not exceed a number of memory fetch streams, perform a fusion of the two loop operations after the split to maintain a dependency relationship between the two statements, and when the total number of the data structures included in the two statements exceeds the number of memory fetch streams, not perform the fusion.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 3 illustrates programs used for a study;

FIG. 13 illustrates an input source code in an example of the embodiment;

DESCRIPTION OF EMBODIMENTS

Figure 1:
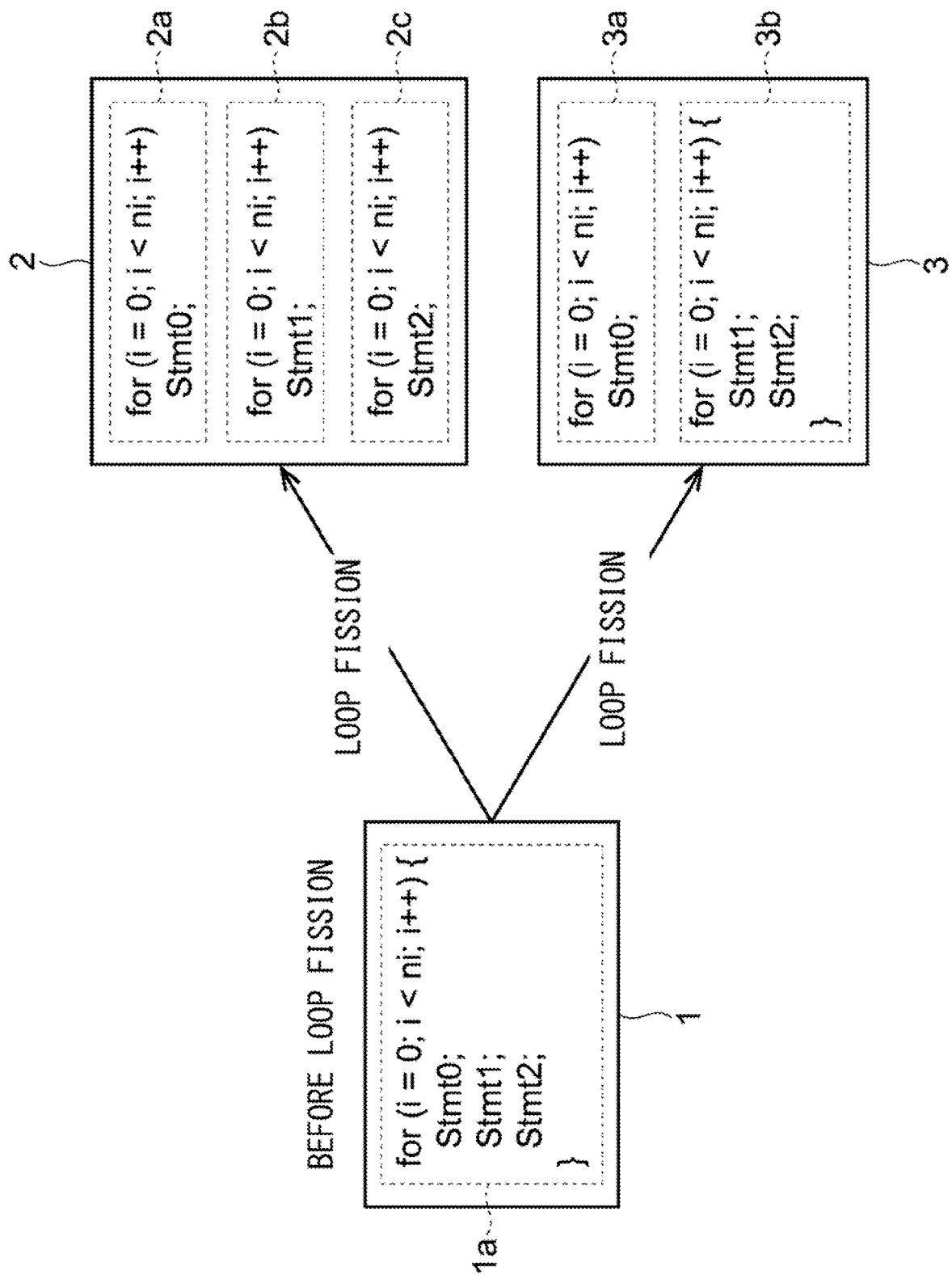
FIG. 1 is a diagram for describing loop fission.

Prior to description of an embodiment, elements that the inventor studied will be described. FIG. 1 is a diagram for describing loop fission.

In the example of FIG. 1, it is assumed that a source code 1 written in C language is subject to loop fission. In the source code 1, one loop operation 1a is executed according to a for loop including three statements "Stmt0", "Stmt1", and "Stmt2". There are several patterns of splitting the loop operation 1a into more loops. Two of the patterns are presented by a source code 2 and a source code 3.

The source code 2 is a source code obtained by splitting the for loop of the source code 1 into three for loops, and the "Stmt0", "Stmt1", and "Stmt2" are executed in respective for loops. In this case, three loop operations 2a to 2c corresponding to respective for loops after split are executed.

On the other hand, the source code 3 is a source code obtained by splitting the for loop of the source code 1 into two for loops, and two loop operations 3a and 3b are to be executed. In this example, the statement "Stmt0" is executed in the loop operation 3a, and the statement "Stmt1" and the statement "Stmt2" are executed in another loop operation 3b.

In this manner, the source code obtained by splitting the loop operation 1a includes two source codes 2 and 3 which have different numbers of loop operations. The number of loop operations after loop fission is also called granularity of fission. The larger the number of loop operations after loop fission is, the smaller the granularity is. The smaller the number of loop operations after loop fission is, the larger the granularity is. In the example of FIG. 1, the granularity of loop fission of the source code 2 is smaller than that of the source code 3.

The execution speed of the program depends on the granularity of loop fission. For example, when the granularity of loop fission is reduced to reduce the number of statements included in one loop operation, cache misses are reduced when the loop operation is executed. However, since one program includes a large number of loop operations, the number of conditional branch instructions for exiting loop operations increases, which rather lowers the execution speed of the program.

The optimal granularity of loop fission to improve the execution speed depends on the hardware configuration of the target machine that executes the program. This will be described in the following.

Figure 2:
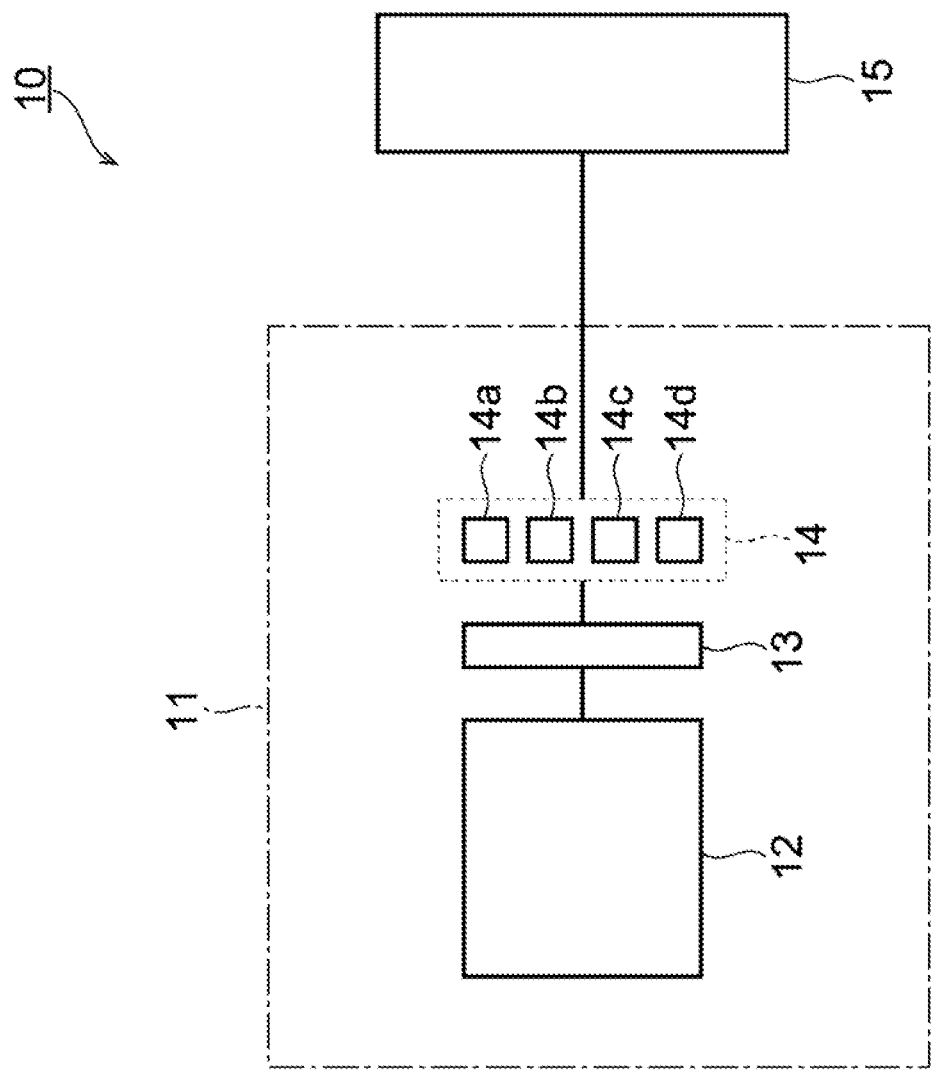
FIG. 2 is a hardware configuration diagram of a target machine.

FIG. 2 is a hardware configuration diagram of a target machine 10.

The target machine 10 is a computing machinery such as, but not limited to, a server or a personal computer (PC), and includes a processor 11 and a main memory 15.

The processor 11 is a hardware device equipped with a data prefetch function, and includes an operation unit 12, a data cache memory 13, and a buffer memory 14.

The operation unit 12 is a circuit element including various types of registers and an arithmetic logic unit (ALU), which performs arithmetic operations and logical operations. The data cache memory 13 is a memory such as, but not limited to, a static random access memory (SRAM) that holds data used by the operation unit 12.

The buffer memory 14 is a hardware device for determining data to be transferred from the main memory 15 to the data cache memory 13, and is provided between the main memory 15 and the data cache memory 13.

The buffer memory 14 includes a plurality of blocks 14a to 14d. The blocks 14a to 14d are units of a storage area that are allocated to hold the address and the access rule of data to be transferred to the data cache memory 13. Hereinafter, the number of blocks 14a to 14d is called the number of memory fetch streams. In the example of FIG. 2, the number of memory fetch streams is four.

The main memory 15 is a hardware device such as, but not limited to, a dynamic random access memory (DRAM) that stores data and instructions used by the operation unit 12.

In the above-described target machine 10, prior to the program execution in the operation unit 12, a prefetch that transfers data necessary for program execution from the main memory 15 to the data cache memory 13 is performed. This reduces time necessary for the program to reference data, improving the execution speed of the program.

Data to be assigned to each of the blocks 14a to 14d by the prefetch is determined at the time of execution. Here, it is assumed that different blocks 14a to 14d are assigned to each array included in a program. For example, consider the case where two arrays "A" and "B" are included in a program. In this case, one block 14a is assigned to store the address and the access rule of the array "A", and another block 14b is assigned to store the address and the access rule of the array "B".

In most programs, when there exists an array inside a loop operation, the elements of the array are often referenced in the order of addresses when the loop operation is executed. Since the elements of the array have contiguous addresses, the execution speed of the program can be improved by prefetching the elements of the array to the data cache memory 13 in this manner.

However, when the number of arrays included in one loop operation exceeds the number of memory fetch streams, it becomes impossible to simultaneously store the addresses and the access rules of all the arrays to the buffer memory 14. Thus, the address and the access rule are frequently evicted from the buffer memory 14 during the execution of the loop operation. Hence, the prefetch cannot be performed, and the execution speed of the program is thereby decreased.

To confirm this, the inventor prepared 25 different programs in which the number of arrays included in a loop operation was 2 to 26, and studied the processing speed of these programs. FIG. 3 illustrates the programs used for the study.

As illustrated in FIG. 3, for example, in a program SC2 in which the number of arrays is 2, two arrays "A1" and "A2" are included in a single for loop. In a program SC3 in which the number of arrays is 3, three arrays "A1", "A2", and "A3" are included in a single for loop. Programs SC4 to SC26, in which the number of arrays is 4 to 26 respectively, were created in the same manner.

When the above-described programs are executed in the target machine 10, the address and the access rule of each array are stored in the corresponding one of the blocks 14a to 14d at the time of executing the for loop as described above. For example, when a for loop of the program SC2 is executed, the address and the access rule of the array "A1" are stored in the block 14a, and the address and the access rule of the array "A2" are stored in the block 14b.

The inventor studied the execution speed of these programs SC2 to SC26. Outcomes of the study are presented in FIG. 4.

Figure 4:
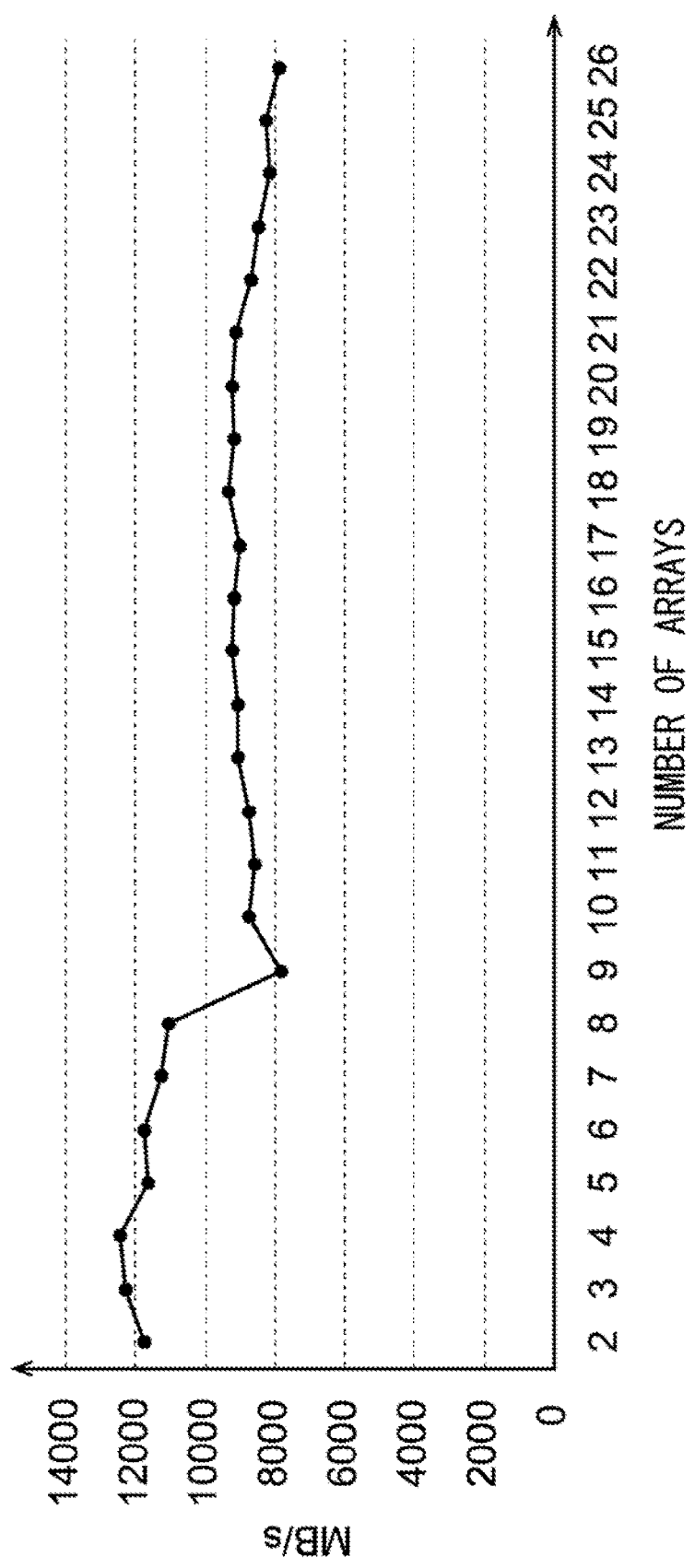
FIG. 4 presents outcomes of the study of the execution speed of the program.

The horizontal axis in FIG. 4 indicates the number of arrays included in the programs SC2 to SC26. For example, when the number of arrays is 3, it indicates the case where the program SC3 in which the number of arrays is 3 was executed.

The vertical axis in FIG. 4 indicates the amount of data that was processed by the processor per second.

In this study, the ARM thunder X2 CN9975 was used as a processor for executing the program.

As presented in FIG. 4, when the number of arrays exceeds 8, the amount of data processing greatly decreases. This is considered because the number of memory fetch streams of the processor is 8.

The above-described results reveal that, in order to improve the execution speed of the program, the number of arrays included in one loop operation is preferably made to be equal to or less than the number of memory fetch streams.

Hereinafter, an embodiment capable of improving the execution speed of a program will be described.

Embodiment

In the present embodiment, a loop operation included in a source code is split as described below such that the number of arrays included in one loop operation does not exceed the number of memory fetch streams.

Hardware Configuration

Figure 5:
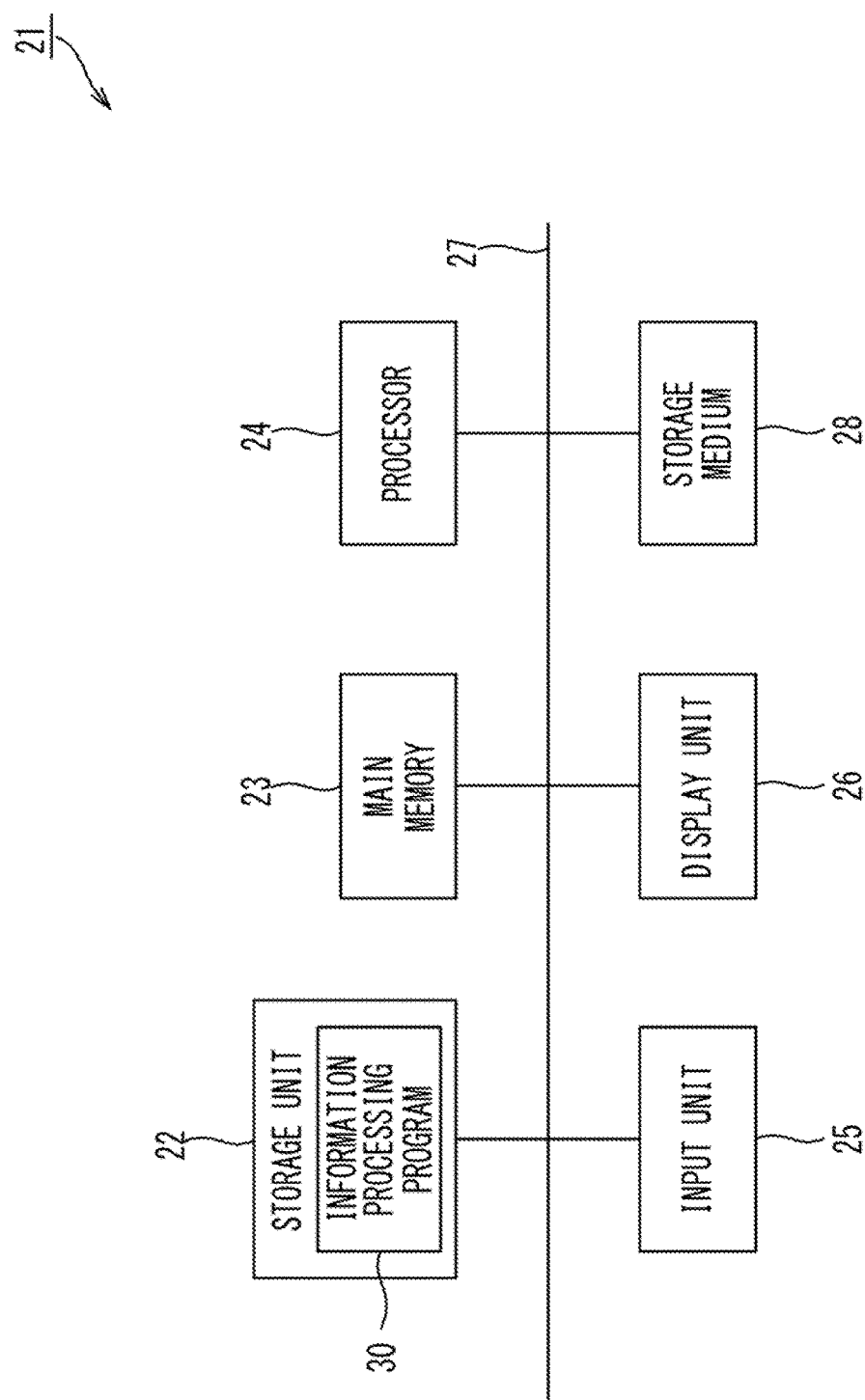
FIG. 5 is a hardware configuration diagram of an information processing device in accordance with an embodiment.

FIG. 5 is a hardware configuration diagram of an information processing device in accordance with the embodiment.

An information processing device 21 is a computing machinery such as, but not limited to, a PC to perform loop fission, and includes a storage unit 22, a main memory 23, a processor 24, an input unit 25, and a display unit 26. These units are connected to each other through a bus 27.

The storage unit 22 is a secondary storage device such as, but not limited to, a hard disk drive (HDD) or a solid state drive (SSD), and stores an information processing program 30 according to the embodiment. The information processing program 30 is a compiler that performs loop fission on an input source code, and outputs the source code after loop fission.

Note that the information processing program 30 may be stored in a computer-readable storage medium 28, and the processor 24 may be caused to read the information processing program 30 stored in the storage medium 28.

Examples of the storage medium 28 include, but are not limited to, physical portable storage media such as a compact disc-read only memory (CD-ROM), a digital versatile disc (DVD), and a universal serial bus (USB) memory. A semiconductor memory such as a flash memory or a hard disk drive may also be used as the storage medium 28. The storage medium 28 is not a temporal storage medium such as carrier waves having no physical entity.

Moreover, the information processing program 30 may be stored in a device connected to a public network, the Internet, or a local area network (LAN), and the processor 24 may read the information processing program 30 and execute it.

On the other hand, the main memory 23 is a hardware device such as a DRAM that temporarily stores data, and the information processing program 30 is loaded on the main memory 23.

The processor 24 is a hardware device such as, but not limited to, a central processing unit (CPU) that controls each unit of the information processing device 21, and executes the information processing program 30 in cooperation with the main memory 23.

The input unit 25 is an input device such as a keyboard and a mouse. The user operates these input devices to specify a source file to be compiled by the information processing program 30 and specify the output destination of the output source file after compilation.

The display unit 26 is a display device such as a liquid crystal display that displays various commands used by the user during the execution of the information processing program 30. Hereinafter, a case where the information processing device 21 executes the information processing program 30 will be described. However, the target machine 10 (see FIG. 2) may execute the information processing program 30, so that the following processes and the functions are implemented.

Functional Configuration

Figure 6:
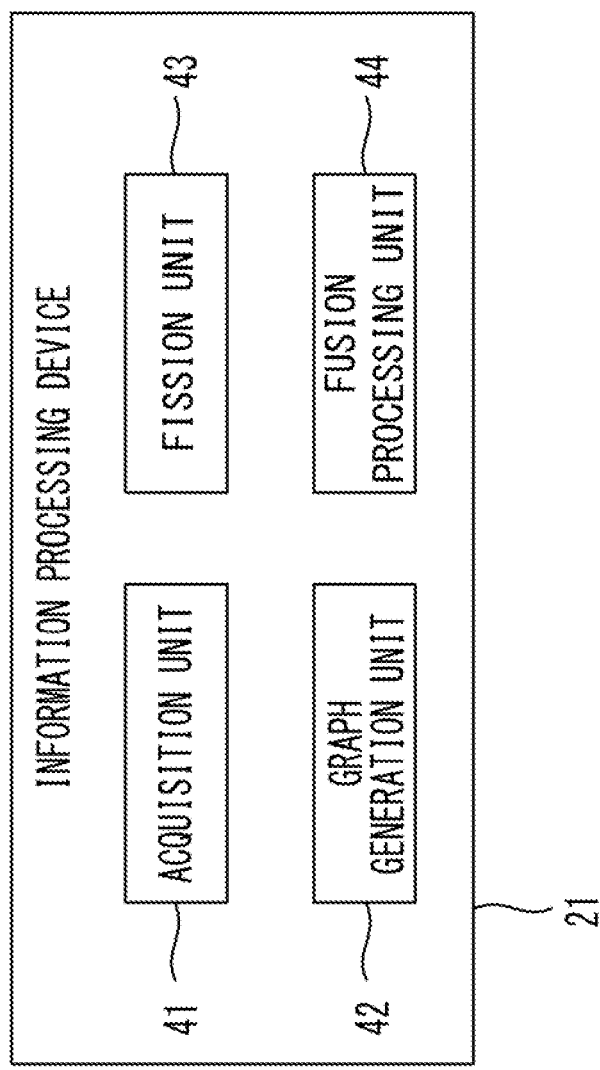
FIG. 6 is a functional block diagram of the information processing device in accordance with the embodiment.

FIG. 6 is a functional block diagram of the information processing device 21 in accordance with the embodiment.

As illustrated in FIG. 6, the information processing device 21 includes an acquisition unit 41, a graph generation unit 42, a fission unit 43, and a fusion processing unit 44. These units are implemented by the processor 24 and the main memory 23 executing the information processing program 30 in cooperation with each other.

Figure 7:
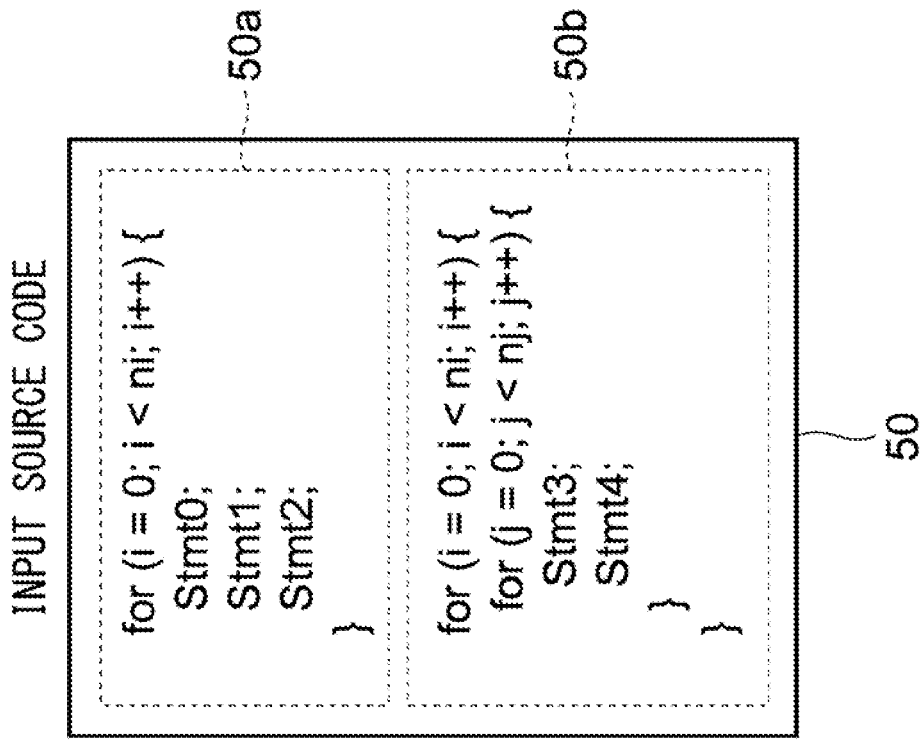
FIG. 7 illustrates an example of an input source code in the embodiment.

The acquisition unit 41 is a functional unit that obtains an input source code to be compiled. For example, the acquisition unit 41 obtains an input source code 50 illustrated in FIG. 7. FIG. 7 illustrates an example of the input source code 50.

The input source code 50 is a program written in C language to be executed in the target machine 10 illustrated in FIG. 2, and includes a plurality of for loops. Hereinafter, the operation executed according to the outermost for loop among these for loops is referred to as a loop operation. In the example of FIG. 7, a first loop operation 50a and a second loop operation 50b are examples of the loop operation.

The first loop operation 50a includes a plurality of statements "Stmt0", "Stmt1", and "Stmt2", and repeatedly executes these statements in a single for loop. The second loop operation 50b is a loop operation having a nesting depth of 2 implemented by two nested for loops, and includes a plurality of statements "Stmt3" and "Stmt4".

Here, a case where the input source code 50 includes a plurality of loop operations 50a and 50b is described as an example. Instead, the input source code 50 may include a plurality of statements within a single loop operation.

Moreover, the language describing the input source code 50 is not limited to C language, and the input source code 50 may be written in C++ or Fortran. Furthermore, a loop may be described by a while statement instead of a for statement.

The graph generation unit 42 (see FIG. 6) obtains dependency relationships among the statements included in the input source code 50 by dependency analysis, and generates a graph based on the obtained dependency relationships. The graph will be described with reference to FIG. 8.

Figure 8:
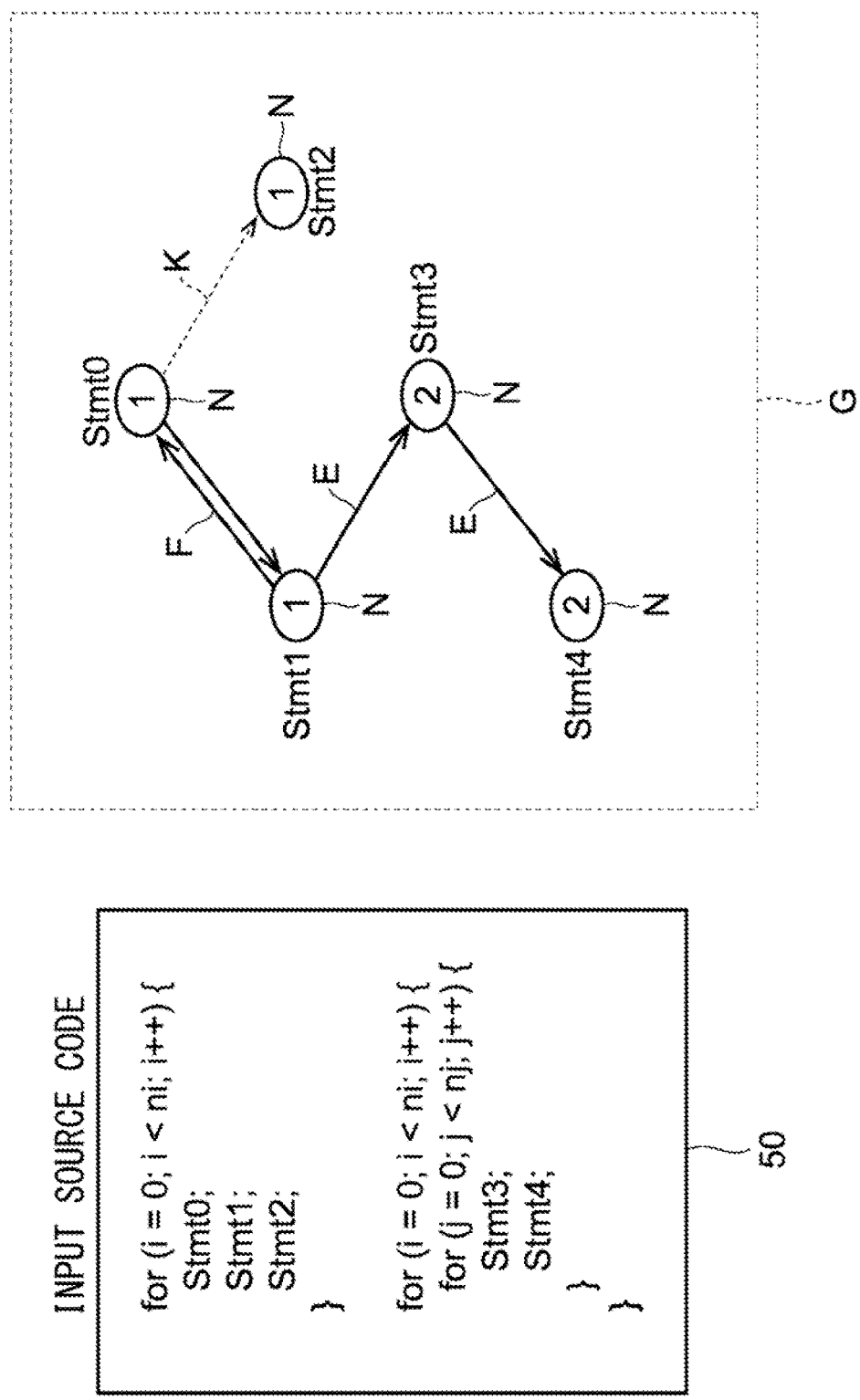
FIG. 8 is a diagram for describing a graph generated by a graph generation unit in accordance with the embodiment.

FIG. 8 is a diagram for describing a graph G that the graph generation unit 42 generates by using the input source code 50.

The graph G is a directed graph in which each of the statements "Stmt0", "Stmt1", "Stmt2", "Stmt3", and "Stmt4" included in the input source code 50 is represented by a node N. The value of the node N indicates the nesting depth in which the statement corresponding to the node N is located. For example, the statement "Stmt3" is located inside the two for statements in the loop operation 50b, which indicates that the statement "Stmt3" is located in the nesting depth of 2. Therefore, the value of the node N corresponding to the statement "Stmt3" is 2. This is also the case for the statement "Stmt4". On the other hand, each of the statements "Stmt0", "Stmt1", and "Stmt2" is located inside a single for statement in the loop operation 50a, and hence is located in the nesting depth of 1. Thus, the values of the nodes N corresponding to the statements "Stmt0", "Stmt1", and "Stmt2" are 1.

The graph generation unit 42 identifies a pair of two statements having any one of dependency relationship including a flow dependency, an output dependency, and a reverse dependency. The graph generation unit 42 provides an edge E between the nodes N corresponding to the two statements having a dependency relationship.

In the example of FIG. 8, it is assumed that there are the following dependency relationships:
Statement "Stmt1" and statement "Stmt3": Flow dependency,
Statement "Stmt3" and statement "Stmt4": Output dependency,
Statement "Stmt0" and statement "Stmt1": Mutual dependency,
Statement "Stmt2": No dependency.

In this case, the edge E is provided between the nodes N corresponding to the statement "Stmt1" and the statement "Stmt3". The direction of the edge E is the direction from the statement appearing earlier to the statement appearing later in the input source code 50. Thus, the direction of this edge E is the direction from the statement "Stmt1" to the statement "Stmt3".

Similarly, the edge E directed from the statement "Stmt3" to the statement "Stmt4" is provided between the nodes N corresponding to the statement "Stmt3" and the statement "Stmt4".

On the other hand, a bidirectional edge F is provided between the nodes corresponding to the statement "Stmt0" and the statement "Stmt1" that have the mutual dependency. For example, when the statement "Stmt0" references the result of the statement "Stmt1" and the statement "Stmt1" references the result of the statement "Stmt0", these statements have a mutual dependency relationship.

For the statement "Stmt2" that have no dependency relationship with other statements, a virtual edge K is provided between the statement "Stmt2" and each of other statements including the same array as the statement "Stmt2". Here, it is assumed that the statement "Stmt0" and the statement "Stmt2" include the same array. Note that the direction of the virtual edge K is also the direction from the statement appearing earlier to the statement appearing later in the input source code 50.

The fission unit 43 (see FIG. 6) references the graph G to split the loop operations 50a and 50b included in the input source code 50 such that the number of loop operations after split is maximized among split patterns that maintain the dependency relationships among the statements. The split method will be described with reference to FIG. 9.

Figure 9:
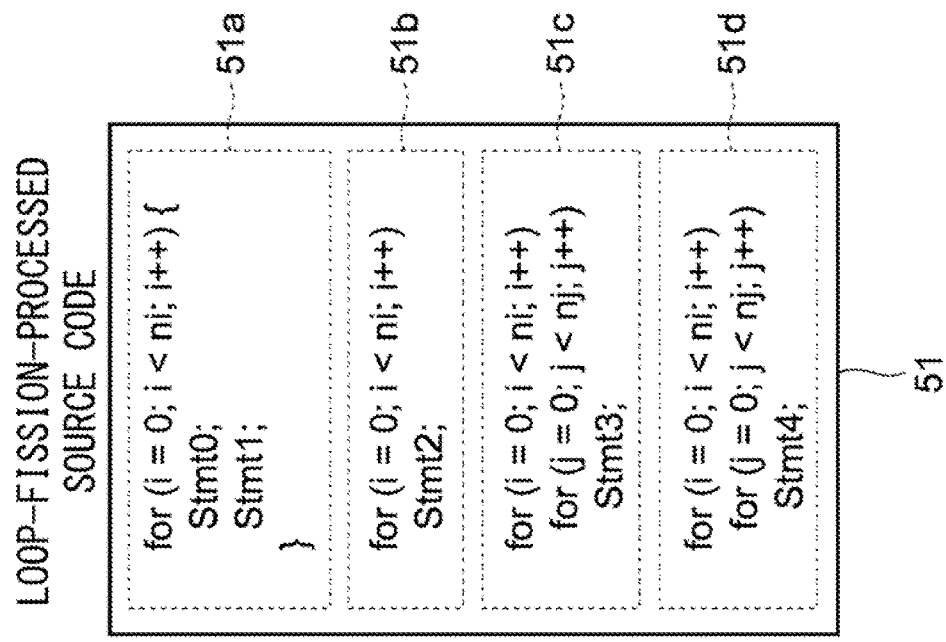
FIG. 9 illustrates the graph and a loop-fission-processed source code in accordance with the embodiment.
Figure 9:
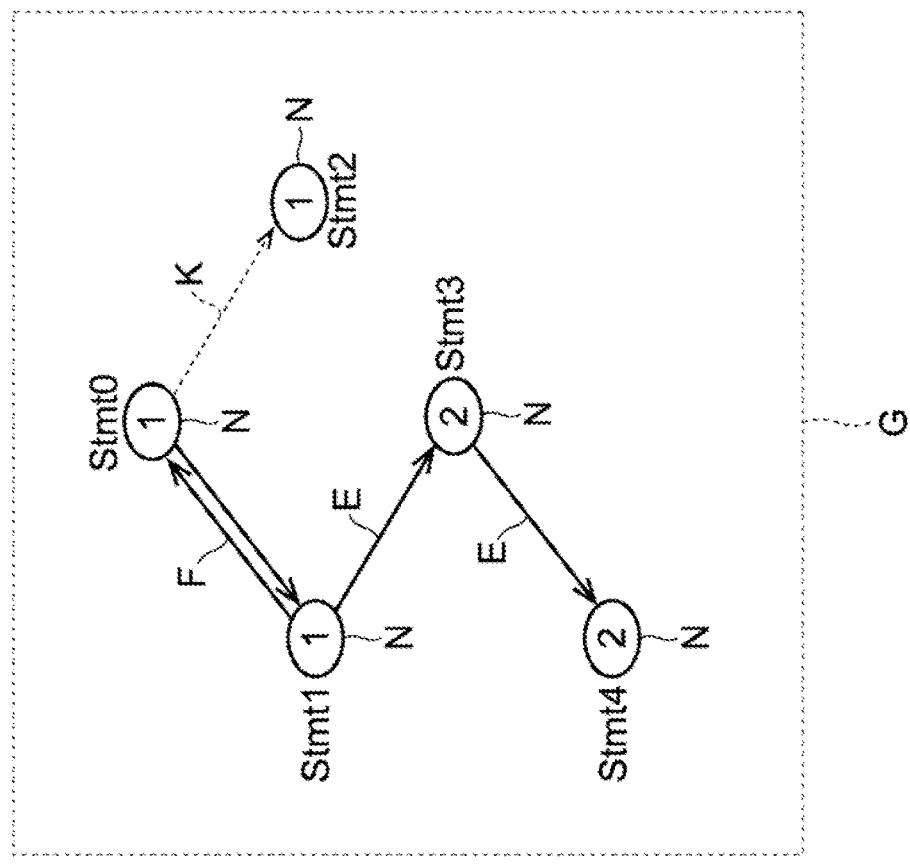

FIG. 9 illustrates the graph G described above and a loop-fission-processed source code 51 obtained by splitting the loop operations.

As illustrated in FIG. 9, the loop-fission-processed source code 51 includes more loop operations than the input source code 50 because of the loop fission of the loop operations, and has first to fourth loop operations 51a to 51d. The fission unit 43 reference the graph G and determines how the loop operation is split as follows.

For example, as illustrated in the graph CL the execution results of the statement "Stmt1" and the statement "Stmt3" do not change even when the statement "Stmt1" and the statement "Stmt3" are executed in different loop operations, as long as the edge E connecting the statement "Stmt1" and the statement "Stmt3" is directed in one direction and the statement "Stmt1", "Stmt3" appears in the same order as defined by the direction of the edge E. Thus, the fission unit 43 references the direction of the edge E to identify the appearance order of the statement "Stmt1" and the statement "Stmt3". Then, the fission unit 43 includes the statement "Stmt1" and the statement "Stmt3" into different loop operations 51a and 51c respectively, such that the appearance order does not change. The pair of the statement "Stmt3" and the statement "Stmt4", as well as the pair of the statement "Stmt0" and the statement "Stmt3" are processed in the same manner.

On the other hand, the direction of the edge F connecting the statement "Stmt0" and the statement "Stmt1" is bidirectional. In this case, the statement "Stmt0" and the statement "Stmt1" have a mutual dependency. Thus, when these statements are executed in separate loop operations, the execution result becomes different from that before loop fission. Therefore, when the direction of the edge F obtained by referencing the graph G is bidirectional, the fission unit 43 includes the statements at both ends of the edge F into the same loop operation. In the example of FIG. 9, the statement "Stmt0" and the statement "Stmt1" are included in the same loop operation 51a.

Through the above-process, among split patterns maintaining the dependency relationships among the statements "Stmt0", "Stmt1", "Stmt2", "Stmt3", and "Stmt4", the loop-fission-processed source code 51 in which the number of loop operations 51a to 51d after split is maximized is obtained.

The fusion processing unit 44 (see FIG. 9) fuses the loop operations after the fission unit 43 splits the loop operations as described above, and outputs a final output source code. The fusion method will be described with reference to FIG. 10.

Figure 10:
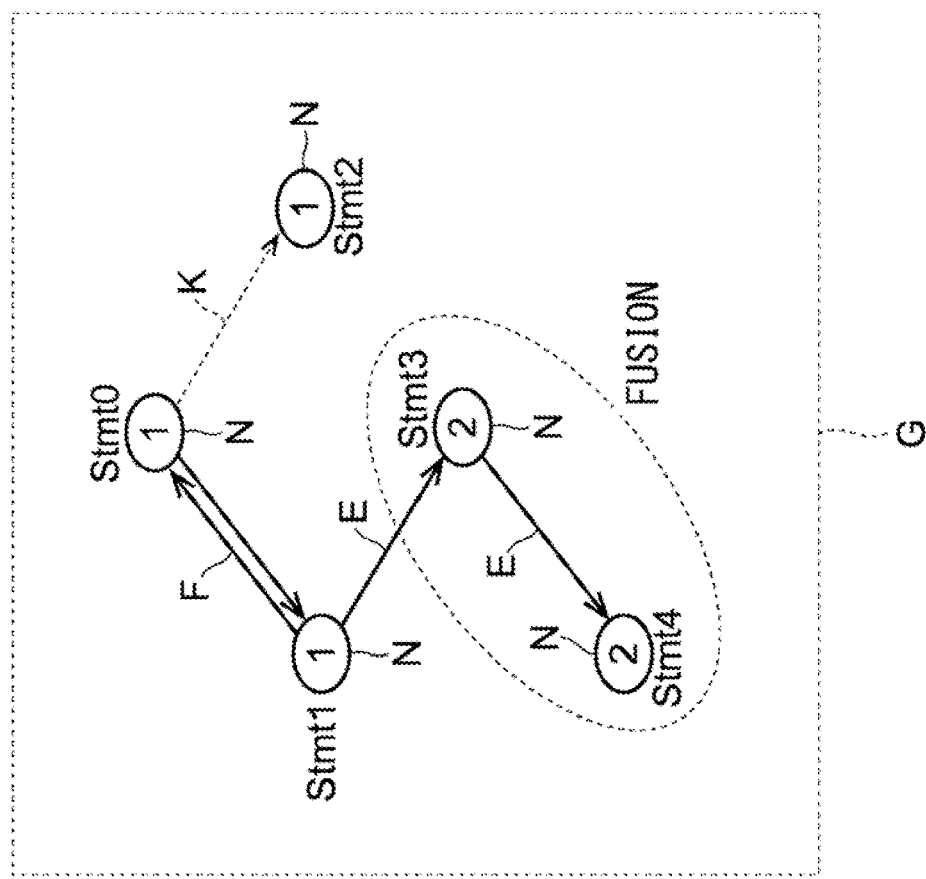
FIG. 10 illustrates the graph and an output source code in accordance with the embodiment.
Figure 10:
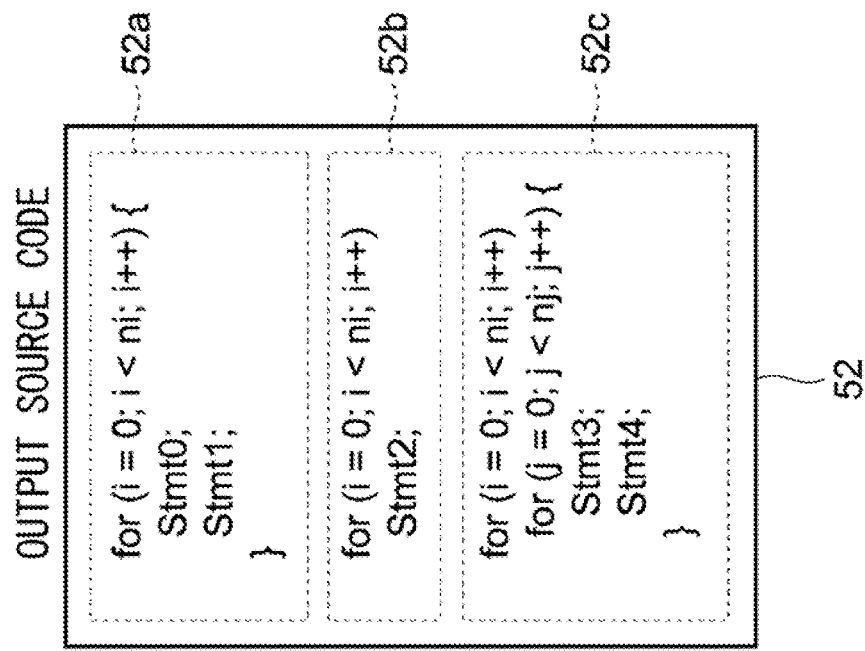

FIG. 10 illustrates the aforementioned graph G and an output source code 52.

The output source code 52 is a source code obtained by fusing some of the loop operations 51a to 51d of the loop-fission-processed source code 51 by the fusion processing unit 44, and has first to third loop operations 52a to 52c.

Which ones of the loop operations 51a to 51d are to be fused depends on the number n of memory fetch streams and the array included in each statement. Hereinafter, it is assumed that the array included in each of the statement "Stmt0" and the statement "Stmt2" is only "A0", and the array included in the statement "Stmt1" is only "A1". It is also assumed that the array included in the statement "Stmt3" is only "A3", and the array included in the statement "Stmt4" is only "A4".

Moreover, it is assumed that the number n of memory fetch streams is 2 for simplification.

In this case, when the number of arrays included in a single loop operation is greater than the number n of memory fetch streams, the address and the access rule are evicted from the buffer memory 14, which in turn decreases the execution speed of the loop operation as described above.

For example, when the loop operations 51a and 51b are fused to execute the statements "Stmt0", "Stmt1", and "Stmt2" in a single for loop, the for loop includes three arrays "A0", "A1", and "A2", and hence the number of arrays exceeds n (=2).

Thus, the fusion processing unit 44 does not fuse the loop operations 51a and 51b.

On the other hand, even when the loop operations 51c and 51d are fused to execute the statement "Stmt3" and the statement "Stmt4" in a single for loop, the number of arrays included in the for loop becomes 2, and does not exceed the number n of memory fetch streams (=2).

Therefore, the fusion processing unit 44 fuses these loop operations 51c and 51d to generate the new loop operation 52c. In this case, both the nesting depths in which the statement "Stmt3" and the statement "Stmt4" were located before loop fusion are 2. Thus, the nesting depths of the statements "Stmt3" and "Stmt4" are also 2 in the loop operation 52c after fusion.

When a deeply-nested loop operation is left split into two, a conditional branch instruction for exiting a loop operation needs to be executed independently in each loop operation, which in turn increases the number of instructions to be executed, and hence the program execution time increases. Therefore, by fusing the deeply-nested operations such as the loop operations 51c and 51d, the number of conditional branch instructions is greatly reduced, and the effect of reducing the execution time by fusion increases.

In view of this, the fusion processing unit 44 references the nesting depth indicated by the value of the node N in the graph G, and determines two loop operations to be fused based on the nesting depth. For example, the fusion processing unit 44 obtains the larger value of the values of the two nodes N at both ends of each of the edges E and K, and fuses the loop operations in order from the edge having a larger value of the obtained values of the edges E and K.

Moreover, the fusion processing unit 44 references the direction of the edge E between the nodes N corresponding to the statement "Stmt3" and the statement "Stmt4", and arranges the statement "Stmt3" and the statement "Stmt4" in the appearance order indicated by the direction of the edge E in the loop operation 52c. Thereby, the dependency relationship between the statements "Stmt3" and "Stmt4" in the loop operation 52c can be maintained after fusion, and hence the output source code 52, which outputs the same execution result as the input source code 50, can be obtained.

Flowchart

Figure 11:
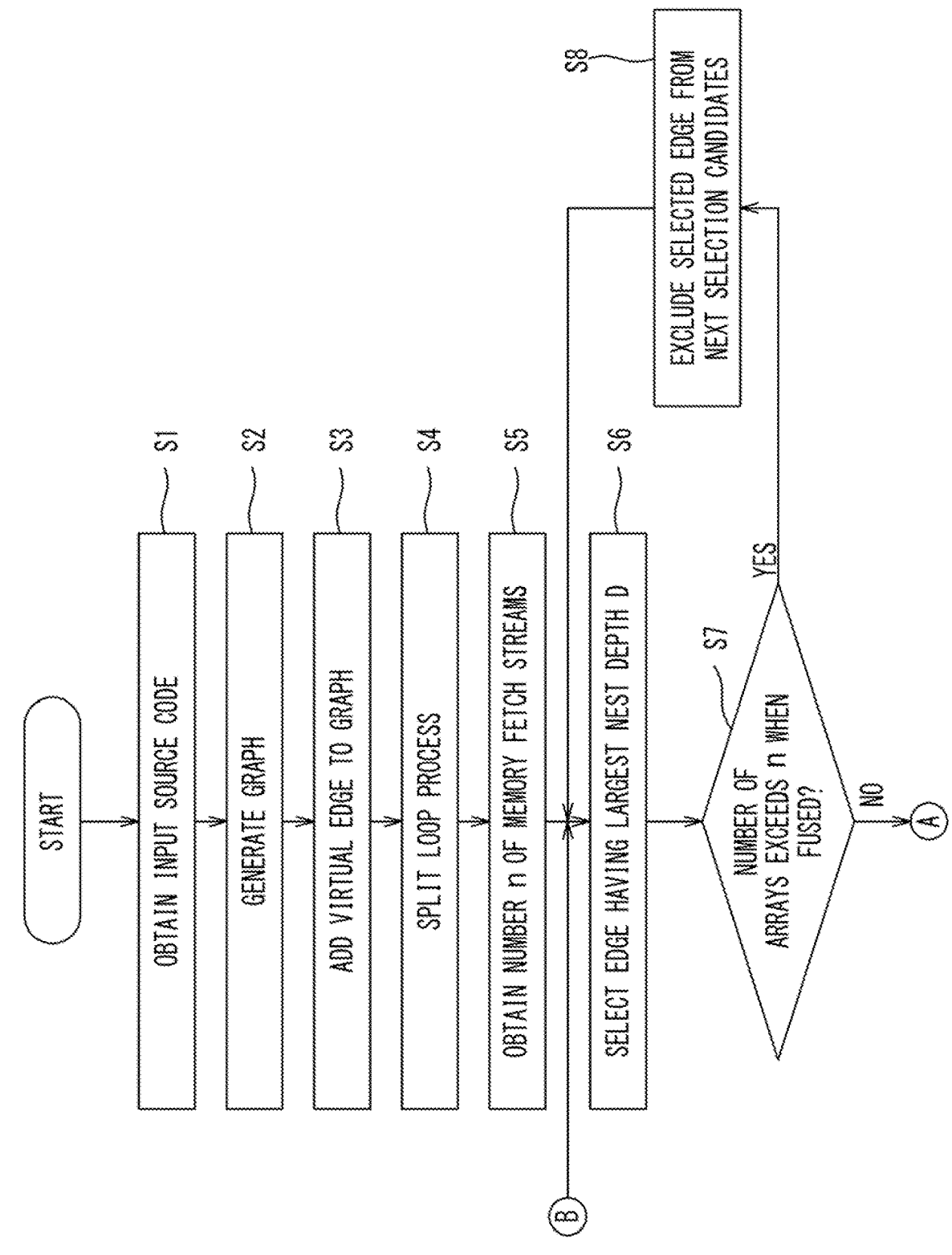
FIG. 11 is a flowchart (No. 1) of a process executed by the information processing device in accordance with the embodiment.
Figure 12:
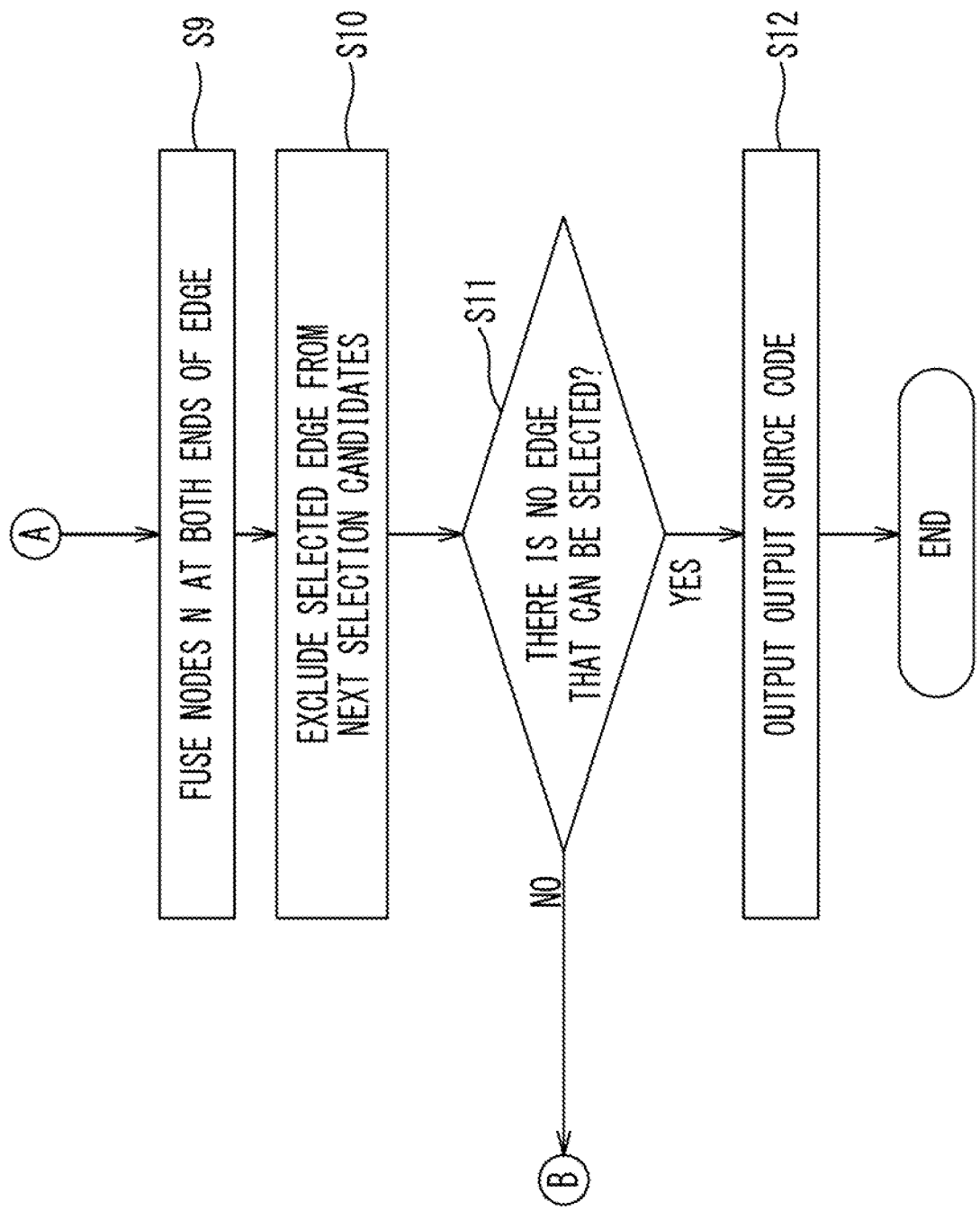
FIG. 12 is a flowchart (No. 2) of the process executed by the information processing device in accordance with the embodiment.

Next, an information processing method in accordance with the embodiment will be described. FIG. 11 and FIG. 12 are flowcharts of the information processing method in accordance with the embodiment.

First, in step S1, the acquisition unit 41 obtains the input source code 50 (see FIG. 7).

Then, in step S2, the graph generation unit 42 performs the dependency analysis of the statements included in the input source code 50, and generates the graph G illustrated in FIG. 8 based on the analysis result.

Next, in step S3, the graph generation unit 42 adds a virtual edge K to the graph G. As described above, the edge K is provided between the nodes N corresponding to the statements that have no dependency relationship but include the same array.

Subsequently, in step S4, the fission unit 43 splits each of the loop operations 50a and 50b included in the input source code 50. Accordingly, as illustrated in FIG. 9, the loop-fission-processed source code 51 including the loop operations 51a to 51d is generated.

This split is performed such that the number of loop operations 51a to 51d after split is maximized among split patterns that maintain the dependency relationships among the statements as described above. Therefore, since the number of loop operations obtained by loop fission increases, the number of candidate pairs of loop operations to be fused later can be increased.

Then, in step S5, the fusion processing unit 44 obtains the number n of memory fetch streams. For example, the fusion processing unit 44 may obtain the number n of memory fetch streams input by the user through the input unit 25, or may obtain the number n of memory fetch streams by the dependence analysis by a compiler.

Then, in step S6, the fusion processing unit 44 identifies a value D, which is defined as larger one of the two values of the both nodes N of the edge E. The fusion processing unit 44 identifies the values D for all of the edges E. The value D indicates the nesting depth of deeper one of the nests, in which two statements corresponding to both ends of the edge E locate as described above. Therefore, hereinafter, the value D is also called the nesting depth D of the edge E.

Similarly, the fusion processing unit 44 also identifies the value D with respect to the virtual edge K.

Then, the fusion processing unit 44 selects the edge having the largest D among the edges E and K.

Next, in step S7, the fusion processing unit 44 determines whether the number of arrays included in the loop operation after fusion exceeds the number n of memory fetch streams if the two loop operations including the respective statements at both ends of the selected edge E or K are fused.

When it is determined that the number of arrays included in the loop operation after fusion exceeds the number n of memory fetch streams (YES), the process proceeds to step S8, where the fusion processing unit 44 excludes the selected edge E or K from the next selection candidates. Thereafter, the process is executed again from step S6.

On the other hand, when it is determined that the number of arrays included in the loop operation after fusion does not exceed the number n of memory fetch streams in step S7 (NO), the process proceeds to step S9 in FIG. 12. In step S9, the fusion processing unit 44 fuses the two loop operations including the respective statements at both ends of the edges E and K that are selected in step S6.

Then, in step S10, the fusion processing unit 44 excludes the edges E and K that are subjected to fusion in step S9 from the next selectin candidates.

Next, in step S11, the fusion processing unit 44 determines whether there is no edge E and K that can be selected. When it is determined that there is no edge E and K that can be selected (YES), the process proceeds to step S12, where the fusion processing unit 44 outputs the output source code 52 illustrated in FIG. 10.

On the other hand, when it is determined that there is the edge E or K that can be selected (NO), the process is executed again from step S6.

As described above, the basic steps of the information processing method in accordance with the embodiment are completed.

Thereafter, the output source code 52 is compiled by another compiler to generate a binary file executable in the target machine 10 illustrated in FIG. 2.

According to the embodiment described above, in steps S7 and S9, two loop operations each including the corresponding one of the two statements are fused such that the number of arrays included in one loop operation does not exceed the number n of memory fetch streams.

Therefore, the address and the access rule are prevented from being frequently evicted from the buffer memory 14 in FIG. 2, which can achieve the technological improvement that the execution speed of the program increases.

Furthermore, by fusing the loop operations in this manner, the number of conditional branch instructions for exiting loop operations is reduced, which in turn further increases the execution speed of the program.

Moreover, in step S6, the edge E having the largest nesting depth D is selected among the edges E. Thus, the loop fusion is performed in order from the loop operations having a larger nesting depth. Accordingly, the loop operations that are deeply nested and hence include many conditional branch instructions are preferentially reduced, and the effect of reducing the execution time by fusion increases.

In addition, in step S3, a virtual edge is provided between two statements that have no dependency relationship. Therefore, the loop operations each including the corresponding one of two statements having no dependency relationship can be candidates for fusion. Then, by actually fusing these loop operations, the advantage of reducing the execution time due to the reduction in the number of conditional branch instructions can be obtained.

In particular, in programs for use in high performance computing (HPC), the number of statements included in the loop operation tends to be large. Thus, burden on the developer can be reduced by automatically executing the loop fission and fusion on such programs as in the embodiment.

Next, a more specific example using a detailed source code will be described.

FIG. 13 illustrates an input source code used in this example.

In this example, an input source code 60 written in C language is used. The input source code 60 has two nested for loops, and a loop operation 60a is executed by the outer for loop. The loop operation 60a includes four arrays A, B, C, and D.

Hereinafter, a statement included in the source code 60 is identified by the comment statement in the same line as the statement. For example, the comment statement "Stmt0" indicates the statement "A[i]=alpha;".

Then, according to the flowcharts of FIG. 11 and FIG. 12 described above, the information processing device 21 performs the following processes on the input source code 60.

First, the acquisition unit 41 obtains the input source code 60 (step S1), and then the graph generation unit 42 generates the graph G (step S2).

Figure 14:
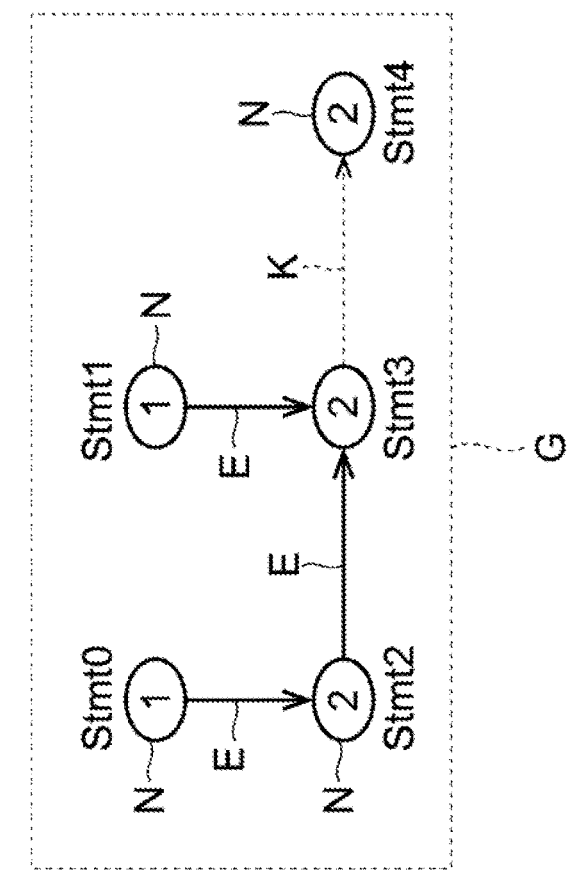
FIG. 14 illustrates the input source code and a graph in the example of the embodiment.

FIG. 14 illustrates the input source code 60 and the graph G.

As illustrated in FIG. 14, there are following dependency relationships among the statements of the input source code 60.

Statement "Stmt0" and statement "Stmt2": Flow dependency through the array "A",
Statement "Stmt1" and statement "Stmt3": Flow dependency through the array "B",
Statement "Stmt2" and statement "Stmt3": Output dependency through the array "C", and
Statement "Stmt3" and statement "Stmt4": No dependency relationship.

According to these dependency relationships, the graph generation unit 42 generates the graph G.

The graph G is a directed graph whose nodes N correspond to each statement as described above, and the value of the node N represents the nesting depth in which each statement is located.

For example, the statement "Stmt2" is located inside the two for statements in the loop operation 60a, and is located in the nesting depth of 2. Thus, the value of the node N corresponding to the statement "Stmt2" is 2. In contrast, the statement "Stmt0" is located inside single for statement in the loop operation 60a, and is located in the nesting depth of 1. Thus, the value of the node N corresponding to the statement "Stmt0" is 1.

Furthermore, the edge E is provided between the nodes N corresponding to respective two statements having the dependency relationship, and the direction indicating the appearance order of the statements in the input source code 60 is given to the edge E.

For example, as described above, the statement "Stmt1" and the statement "Stmt3" have a flow dependency through the array "B". Therefore, the edge E is provided between the nodes N corresponding to the statement "Stmt1" and the statement "Stmt3". Furthermore, in the input source code 60, the statement "Stmt1" appears earlier, and the statement "Stmt3" appears later. Thus, the direction from the statement "Stmt1" to the statement "Stmt3" is given to the edge E between the statement "Stmt1" and the statement "Stmt3".

Then, the graph generation unit 42 adds a virtual edge K to the graph G (step S3).

As described above, the virtual edge K is provided between two statements that include the same array but have no dependency relationship. In this example, the statement "Stmt3" and the statement "Stmt4" have no dependency relationship, but include the same array "B". Thus, the virtual edge K is provided between the nodes N corresponding to the statement "Stmt3" and the statement "Stmt4".

Then, the fission unit 43 splits the loop operation 60a by referencing the graph G.

Figure 15:
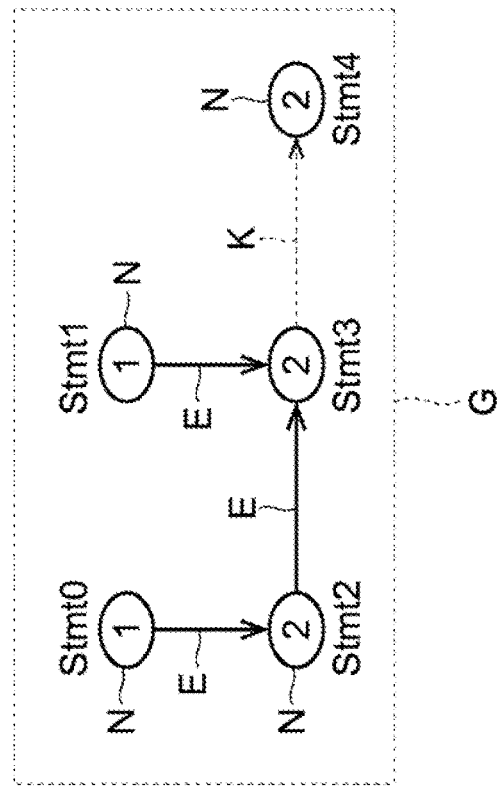
FIG. 15 illustrates a loop-fission-processed source code and the graph in the example of the embodiment.

FIG. 15 illustrates the loop-fission-processed source code 61 obtained by loop fission and the graph G.

As described above, the loop operation is split such that the number of loop operations after split is maximized among split patterns maintaining the dependency relationships among the statements. In this example, there is no pair having a mutual dependency relationship among the statements "Stmt0", "Stmt1", "Stmt2", "Stmt3", and "Stmt4". Therefore, even when the loop operation is split so that a single loop operation includes only one statement, the dependency relationships among the statements can be maintained. Thus, the loop operation 60a is split into first to fifth loop operations 61a to 61e each including only one statement.

Then, the fusion processing unit 44 obtains the number n of memory fetch streams (step S5). In this example, it is assumed that the number n of memory fetch streams is 2.

Next, the fusion processing unit 44 selects the edge having the largest nesting depth D among the edges E. and K (step S6). In this example, since all the edges E and K have a depth D of 2. Therefore, all the edges E and K are selected.

Then, the fusion processing unit 44 fuses the loop operations each including the corresponding one of the statements at both ends of each edge E, K, such that the number of arrays included in one loop operation does not exceed the number n of memory fetch streams (=2) (steps S7 to S10).

Figure 16:
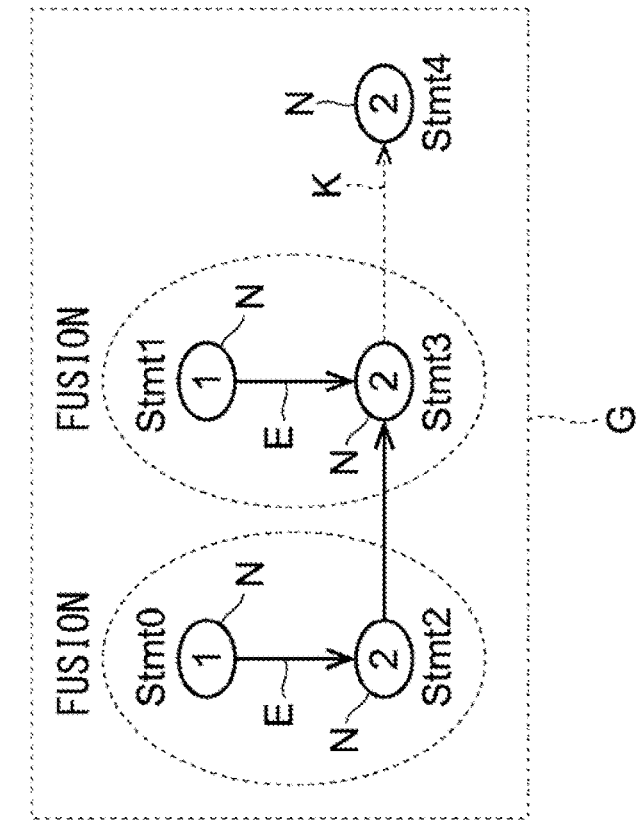
FIG. 16 illustrates an output source code and the graph in the example of the embodiment.

FIG. 16 illustrates an output source code 62 obtained by loop fusion as described above and the graph G.

As illustrated in FIG. 16, the output source code 62 includes first to third loop operations 62a to 62c.

The first loop operation 62a is a loop operation obtained by fusing the first loop operation 61a including the statement "Stmt0" and the third loop operation 61c including the statement "Stmt2". The arrays included in the first loop operation 62a are "A" and "C". Thus, the number of arrays included in the first loop operation 62a is 2, and therefore, does not exceed the number n of memory fetch streams (=2).

Moreover, the second loop operation 62b is a loop operation obtained by fusing the second loop operation 61b including the statement "Stmt1" and the fourth loop operation 61d including the statement "Stmt3". The second loop operation 62b includes only two arrays "B" and "C". Therefore, the number of arrays does not exceed the number n of memory fetch streams (=2).

On the other hand, when the third loop operation 61c and the fourth loop operation 61d are fused, the loop operation after loop fusion includes three arrays "A", "B", and "C", and the number of arrays exceeds the number n of memory fetch streams (=2). Thus, the fusion processing unit 44 does not fuse the third loop operation 61c and the fourth loop operation 61d. For the same reason, the fourth loop operation 61d and the fifth loop operation 61e are not fused.

Therefore, the fusion processing unit 44 determines that there is no edge that can be selected (step S11), and outputs the output source code 62.

By these steps, the process for the case using the input source code 60 is completed.

According to the above example, the number of arrays included in each of the first to third loop operations 62a to 62c in the output source code 62 does not exceed the number of memory fetch streams. Therefore, when each of the loop operations 62a to 62c is executed in the target machine 10, the address and the access rule are prevented from being evicted from the buffer memory 14, and the execution speed of the program is improved.

Furthermore, some of the loop operations 61a to 61e in the loop-fission-processed source code 61 in FIG. 15 are fused. This reduces the number of conditional branch instructions for exiting loop operations, and thereby further improves the execution speed of the program.

Although the embodiment has been described in detail, the embodiment is not limited to the above-described embodiment.

For example, instead of the arrays "A", "B", "C", and "D" in the input source code 60 in FIG. 13, a data structure including elements having contiguous addresses may be described in the input source code 60. When such data structure is described in the loop operation 60a, the elements of the data structure are likely to be read in the order of addresses during the program execution. Therefore, the execution speed of the program is improved as in the case of the arrays by prefetching the data structure to the buffer memory 14 (see FIG. 2).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An information processing device comprising:
a first memory; and
a first processor coupled to the first memory and configured to:
   obtain a source code including loop operations, where a plurality of statements being included in at least one of the loop operations;
   split each of the loop operations into a plurality of loop operations to maintain dependency relationships among statements in the source code; and
   in a case where the two statements each included in corresponding one of the two loop operations after the split have a plurality of data structures including elements including contiguous addresses,
      when the total number of the data structures included in the two statements does not exceed a number of memory fetch streams, perform a fusion of the two loop operations after the split to maintain a dependency relationship between the two statements, and
      when the total number of the data structures included in the two statements exceeds the number of memory fetch streams, not perform the fusion,
   the number of memory fetch streams is equals to a number of blocks, where an address of each of the data structures is stored in a corresponding one of the blocks, and the blocks are arranged between a cache memory and a second memory, where the cache memory and the second memory stores the data structures.

2. The information processing device according to claim 1, wherein the processor is configured to:
   when there is a plurality of pairs of two statements having a dependency relationship in the statements in the source code, obtain a nesting depth in which the statement is located in corresponding one of the loop operations before the split, the nesting depth being obtained for each of the two statement having the dependency relationship in each of the pairs;
   identify a value of the nesting depth of one of the two statements having the dependency relationship for each of the pairs, where the value being larger than the nesting depth of an other of the two statements having the dependency relationship; and
   perform the fusion in order from the pair having the value that is larger than the value of the other pair.

3. The information processing device according to claim 1, wherein the processor is configured to, when the two statements have no dependency relationship and include a same data structure, fuse the two loop operations after the split, where the two loop operations including corresponding one of the two statements having no dependency.

4. The information processing device according to claim 1, wherein the processor is configured not to split the loop operation in the source code, where the loop operation including a plurality of statements having a mutual dependency relationship.

5. The information processing device according to claim 1, wherein the processor is configured to:
   generate a directed graph in which each of the plurality of statements is represented by a node, an edge is provided between the two nodes corresponding to the two statements having the dependency relationship, and a direction indicating an appearance order of the two statements in the source code is given to the edge, and
   when there is the edge between the two nodes, fuse two loop operations each including corresponding one of two statements corresponding to the two nodes, and arrange the two statements in an order indicated by a direction of the edge in the loop operation after the fusion.

6. The information processing device according to claim 5, wherein
   a value of the node indicates a nesting depth in which the statement corresponding to the node is located in the loop operation of the source code;
   the processor is configured to:
   when there is a plurality of edges, obtain the values of two statements corresponding to two nodes at both ends of each of the edges,
      identify the value of one of the two statements for each of the edges, where the value is greater than the value of an other of the two statements; and
      perform the fusion in order from the edge having the value that is larger than the value of the other edge.

7. The information processing device according to claim 1, wherein the data structure is an array.

8. The information processing device according to claim 1, wherein the processor is configured to split the loop operations in the source code such that a number of the loop operations after the split is maximized.

9. A non-transitory computer-readable medium storing an information processing program causing a computer to execute a process, the process comprising:
   obtaining a source code including loop operations, where a plurality of statements being included in at least one of the loop operations;
   splitting each of the loop operations into a plurality of loop operations to maintain dependency relationships among statements in the source code; and
   in a case where the two statements each included in corresponding one of the two loop operations after the split have a plurality of data structures including elements including contiguous addresses,
      when the total number of the data structures included in the two statements does not exceed a number of memory fetch streams, performing a fusion of the two loop operations after the splitting to maintain a dependency relationship between the two statements, and when the total number of the data structures included in the two statements exceeds the number of memory fetch streams, not performing the fusion, the number of memory fetch streams is equals to a number of blocks, where an address of each of the data structures is stored in a corresponding one of the blocks, and the blocks are arranged between a cache memory and a memory, where the cache memory and the memory stores the data structures.

10. A computer-implemented information processing method comprising:

obtaining a source code including loop operations, where a plurality of statements being included in at least one of the loop operations;

splitting each of the loop operations into a plurality of loop operations to maintain dependency relationships among statements in the source code; and in a case where the two statements each included in corresponding one of the two loop operations after the split have a plurality of data structures including elements including contiguous addresses, when the total number of the data structures included in the two statements does not exceed a number of memory fetch streams, performing a fusion of the two loop operations after the splitting to maintain a dependency relationship between the two statements, and when the total number of the data structures included in the two statements exceeds the number of memory fetch streams, not performing the fusion, the number of memory fetch streams is equals to a number of blocks, where an address of each of the data structures is stored in a corresponding one of the blocks, and the blocks are arranged between a cache memory and a memory, where the cache memory and the memory stores the data structures.

\* \* \* \* \*